United States Patent
Beck et al.

(10) Patent No.: US 9,702,403 B2
(45) Date of Patent: Jul. 11, 2017

(54) BEARING ASSEMBLY (71) Applicant: AKTIEBOLAGET SKF, Göteborg (SE)

(72) Inventors: Burkard Beck, Unterpleichfeld (DE); Alexander Dilje, Schweinfurt (DE); Hans-Juergen Friedrich, Königsberg-Römershofen (DE); Helmut Hauck, Euerbach (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/443,186

(22) PCT Filed: Nov. 14, 2013

(86) PCT No.: PCT/EP2013/073848
§ 371 (c)(1),
(2) Date: May 15, 2015

(87) PCT Pub. No.: WO2014/076191
PCT Pub. Date: May 22, 2014

(65) Prior Publication Data
US 2015/0345550 A1 Dec. 3, 2015

(30) Foreign Application Priority Data
Nov. 16, 2012 (DE) .......................... 10 2012 220 985

(51) Int. Cl.
*F16C 25/08* (2006.01)
*F16C 19/26* (2006.01)
(Continued)

(52) U.S. Cl.
CPC ............ *F16C 25/083* (2013.01); *F16C 19/06* (2013.01); *F16C 19/26* (2013.01); *F16C 27/04* (2013.01);
(Continued)

(58) Field of Classification Search
CPC ........ F16C 19/06; F16C 19/26; F16C 25/083; F16C 27/04; F16C 35/045; F16C 35/077;
(Continued)

(56) References Cited

U.S. PATENT DOCUMENTS

| 1,639,684 | A | * | 8/1927 | Bott | ........................ F16C 27/04 |
| | | | | | 277/419 |
| 1,803,591 | A | | 5/1931 | Bott | |

(Continued)

FOREIGN PATENT DOCUMENTS

| CN | 101089413 A | 12/2007 |
| DE | 860651 B | 2/1952 |

(Continued)

*Primary Examiner* — Marcus Charles
(74) *Attorney, Agent, or Firm* — Bryan Peckjian; SKF USA Inc. Patent Dept.

(57) ABSTRACT

A non-locating bearing assembly is configured to rotatably support a shaft relative to a housing while permitting relative axial displacement of the shaft relative to the housing. The bearing assembly includes a bearing having inner and outer rings and that is configured for transmitting radial and axial forces, and a bearing support attachable to the housing and including a support section having a partially cylindrical seat surface for receiving one of the inner and outer bearing rings and forming a sliding seat therefor. The sliding seat allows a relative axial displacement between the support section and one of the inner and outer bearing rings. A spring is disposed on or in the bearing support for generating a force in the axial direction between the bearing support and the one of the inner and outer bearing rings, and the spring element is formed from a segment of the bearing support.

16 Claims, 7 Drawing Sheets (51) Int. Cl.
*F16C 19/06* (2006.01)
*F16C 35/077* (2006.01)
*F16C 27/04* (2006.01)
*F16C 35/04* (2006.01)

(52) U.S. Cl.
CPC .......... *F16C 35/045* (2013.01); *F16C 35/077* (2013.01); *F16C 2220/04* (2013.01); *F16C 2220/42* (2013.01); *F16C 2226/62* (2013.01)

(58) Field of Classification Search
CPC .... F16C 2220/04; F16C 19/04; F16C 35/073; F16C 2220/42; F16C 2226/62; Y10T 29/49696
USPC ....... 384/517, 535, 537, 551, 563, 581, 903; 267/161, 163, 166, 160
See application file for complete search history.

(56) References Cited

U.S. PATENT DOCUMENTS

| | | | | |
|---|---|---|---|---|
| 2,504,776 | A * | 4/1950 | Woodfield | F16C 27/04 384/535 |
| 2,506,404 | A * | 5/1950 | Morton | F16C 23/04 384/535 |
| 2,534,142 | A * | 12/1950 | Morton | F16C 27/04 384/535 |
| 4,455,758 | A * | 6/1984 | Iwafune | G01C 1/02 33/282 |
| 5,061,089 | A * | 10/1991 | Bair | F16C 25/08 384/517 |
| 5,624,193 | A * | 4/1997 | Vogelsberger | F16C 25/083 267/163 |
| 6,409,390 | B1 | 6/2002 | Bouzakis et al. | |
| 7,217,106 | B2 * | 5/2007 | Tanaka | B62D 5/064 180/443 |
| 8,444,323 | B2 * | 5/2013 | Bostwick | H02K 5/1732 384/585 |
| 8,840,312 | B1 * | 9/2014 | Fisher | F16C 35/067 384/537 |
| 8,905,644 | B2 * | 12/2014 | Esenwein | B24B 23/028 384/537 |
| 2007/0211976 | A1 | 9/2007 | Fox et al. | |

FOREIGN PATENT DOCUMENTS

| | | |
|---|---|---|
| DE | 1653726 A1 | 12/1971 |
| DE | 7927829 U1 | 6/2002 |
| DE | 102005058078 A1 | 6/2007 |
| DE | 102008056024 A1 | 5/2010 |
| DE | 102010030373 A1 | 12/2011 |
| EP | 0147372 A2 | 10/1984 |
| FR | 1589720 A | 4/1970 |

* cited by examiner

Fig. 8

BEARING ASSEMBLY

CROSS-REFERENCE

This application is the U.S. National Stage of International Application No. PCT/EP 2013/073848 filed on Nov. 14, 2013, which claims priority to German patent application no. 10 2012 220 985.9 filed on Nov 16, 2012.

TECHNOLOGICAL FIELD

The invention relates to a bearing assembly having non-locking-bearing function, using which bearing assembly a first component, in particular a shaft, can be supported rotabtably but displaceably in the axial direction relative to a second component, in particular a housing

BACKGROUND

Non-locating bearing assemblies of the above-mentioned type are needed in a variety of applications where a shaft must be rotatably fixed both radially and axially relative to a housing. A first bearing of the assembly is configured as a locating bearing, that is a bearing that transmits both radial and axial forces from the shaft to the housing. However, for the purpose of obtaining a statically determined bearing assembly, a second bearing of the assembly is configured as a non-locating bearing, that is, a bearing that transmits only radial forces A non-locating bearing is one that is displaceable in an axial direction and thus does not transmit axial forces from the bearing to the housing.

An electrical machine is an application example of a locating/non-locating bearing assembly. For cost reasons the supporting of a rotor relative to a housing is often embodied using a ball-bearing assembly, i.e. both bearing positions—the locating-bearing side and the non-locating-bearing side—each include a ball bearing. Accordingly at the non-locating bearing position a sliding seat is provided between the bearing outer ring and the housing bore, so that said non-locating bearing function is given.

It is disadvantageous here, firstly, that with this conception vibrations can result that the loosely sitting bearing outer ring conducts in the axial direction. This impairs the smooth running of the bearing assembly and the service life of the same.

Another problem is that, in particular if the housing is comprised of light metal, a running-in or embedding of the bearing outer ring into the housing bore can result.

It has therefore become known to install spring elements between the housing and the bearing outer ring, which spring elements generate a spring force in the axial direction. The problem of running-in can be countered by the bearing outer ring not being directly installed in the housing bore, but indirectly via a steel sleeve.

In both cases special components are needed, which can create difficulties above all from assembly standpoints. The assembly of the bearing assembly is thus difficult and sometimes only possible by specialized personnel.

SUMMARY

The object of the invention is to provide a bearing assembly of the above-mentioned type, which ensures a low-vibration and low-wear supporting, but which in addition is characterized by a compact and simple-to-install design.

The solution of this object by the invention is characterized in that the bearing assembly includes: a bearing that is configured for transmission of radial and axial forces, wherein at least one of the bearing rings includes an at least partially cylindrical outer- or inner-surface, a bearing support, which includes a support section including an at least partially cylindrical seat surface, wherein the support section is configured for receiving a bearing ring with its cylindrical outer- or inner-surface, wherein between the cylindrical seat surface and the cylindrical outer- or inner-surface of the bearing ring a sliding seat is formed, which allows a relative displacing in the axial direction between the support section and the bearing ring, wherein the bearing support includes centering means, using which it can be centered relative to one of the components, wherein the bearing support includes attachment means, using which it can be attached to one of the components, and wherein on or in the bearing support a spring element is disposed, which is configured for generating a spring force effective in the axial direction between the bearing support and the bearing ring held by the support section.

Here it is preferably the bearing outer ring that is held by the bearing support.

The bearing is preferably configured as a rolling-element bearing, in particular as a deep groove ball bearing.

The bearing support can include a radially extending attachment flange, using which it can be attached to the one component using the attachment means.

A stop for limiting of the axial movability, relative to the support section, of the bearing ring received by the support section can be disposed in an axial end region of the support section.

The attachment means are preferably screws.

The centering means can be formed by a shoulder, which is formed in the bearing support and which engages into a congruent formation in one of the components, in particular in the housing.

The spring element can be formed by a material section, which is formed from the material of the bearing support. However, it can also be formed as a separate component that is mounted between the bearing ring supported by the support section and the bearing support.

The bearing support and the bearing, together with the spring element and optionally the stop, can be configured as a preassembled unit.

According to a preferred embodiment of the invention, the bearing support is comprised of a continuously formed metal-plate part, in particular of a deep-drawn metal-plate part. However, plastic material can also be attached thereto.

In addition to steel or plastics as material for the bearing support, it can also be provided to manufacture the bearing support or parts thereof from a light metal, a compound-or a sintered- or sintered-like-material.

The proposed bearing assembly is preferably configured as a preassembled or at least partially preassembled bearing unit, which in addition to the pure bearing function also ensures the axial movability, i.e. the non-locating-bearing function. With such a (partially) preassembled unit the logistics expense can be significantly reduced, which in turn reduces the costs.

Thus according to the invention a cost-effective solution for axially non-fixed (rolling-element) bearings (non-locating bearings) including an adapted or integrated attachment flange and integrated axial preload is provided.

The proposed non-locating bearing is characterized in an advantageous manner by a strong vibration-damping effect.

Standard rolling-element bearings, in particular deep groove ball bearings, can be used. Economic advantages thereby result.

Configuring the bearing support (bearing housing) as a flange-type bearing support helps ensure that radial forces are supported. Such a structure also allows for a simple attachment to a housing, e.g., to a motor housing, preferably via a screw connection. The flange can be comprised of metal plate so that only forming processes, punching processes and bending processes are used in its manufacturing.

The bearing support has an integrated or adapted centering function, which represents a significant assembly facilitation. Accordingly the security against assembly error is lower, which in turn acts in a cost-reducing manner.

Preferably the bearing support is manufactured exclusively by forming technology, preferably from deep-drawn steel.

If alternatively or additionally a plastic forming process is used as the manufacturing method for the bearing support, additional assembly processes can be avoided. The integration of various further assembly processes can occur during the main time, for example, of an injection molding process. This results in very cost-effective production. A further advantage is to be achieved with multiple-component forming processes, namely the placing of different material depending on the respective to-be-fulfilled function of the complete bearing assembly.

Furthermore the spring- and/or damping-element is adapted or integrated on or in the bearing support. The effective direction of the springing or damping is preferably provided in the axial direction, but even a radially-acting spring effect is not excluded. Due to the integration of the spring- or damping-element an additional handling effort by the user of the bearing assembly can be omitted.

If identical materials (steel) are provided at the interface between bearing ring (outer ring) and bearing support, in an advantageous manner an identical thermal behavior is present, so that no temperature-related changes of the loose fit (i.e. of the sliding seat) are to be feared.

BRIEF DESCRIPTION OF THE DRAWINGS

Exemplary embodiments of the invention are depicted in the drawings.

DETAILED DESCRIPTION

Figure 1:
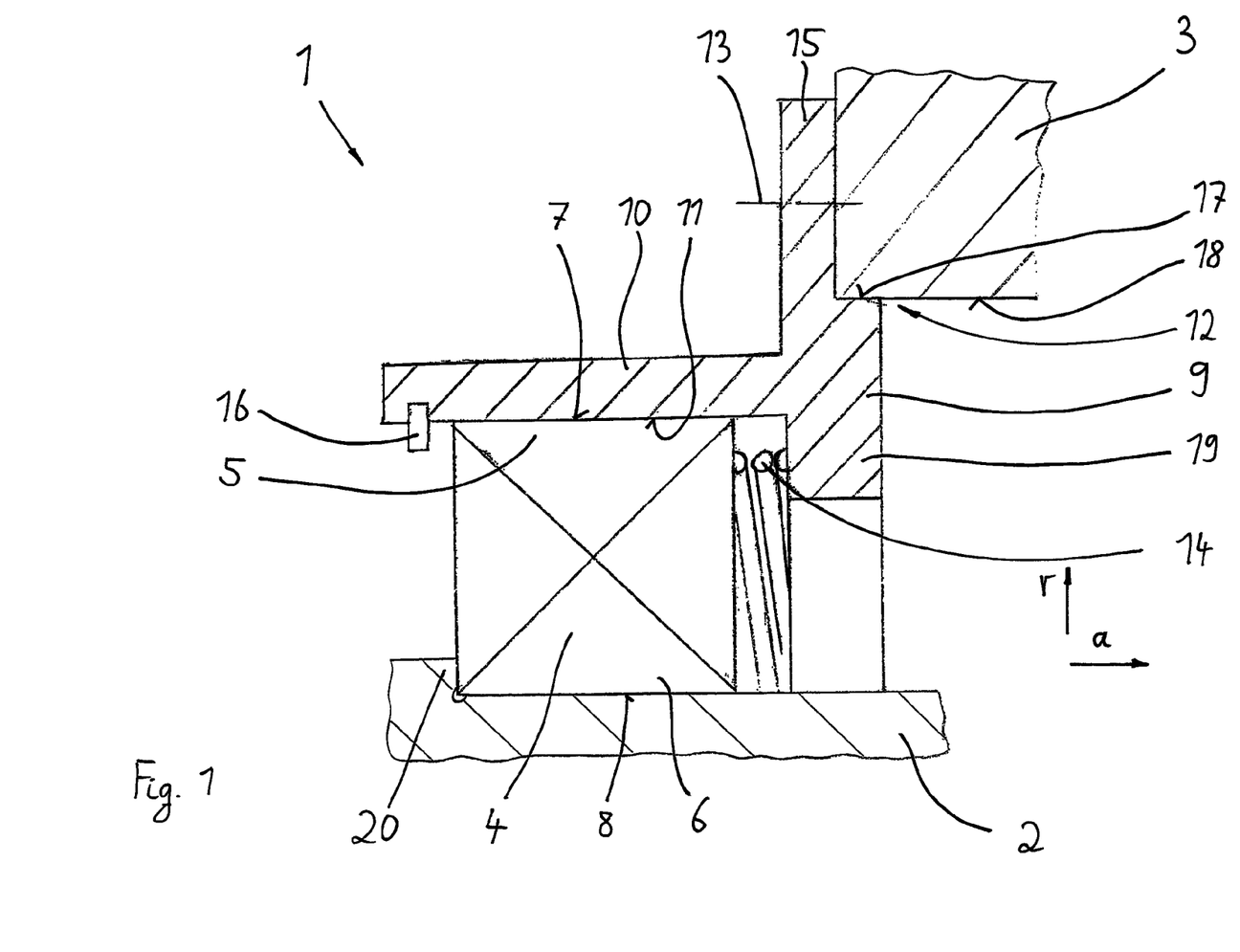
FIG. 1 schematically shows a bearing assembly in radial section, using which, according to a first embodiment of the invention, a shaft part is supported with non-locating-bearing function relative to a housing.

In FIG. 1 a first embodiment of the inventive bearing assembly 1 is depicted. A shaft 2 is supported here in a housing 3 using a rolling-element bearing 4. Here the bearing assembly 1 is configured as a non-locating bearing assembly, i.e. forces in radial direction r are transmitted from the shaft 2 into the housing 3, but not forces in axial direction a.

The outer ring 5 and the inner ring 6 of the rolling-element bearing 4, configured as a deep groove ball bearing, are indicated only schematically. Both the outer ring 5 and the inner ring 6 have a cylindrical outer surface 7 or a cylindrical inner surface 8. The cylindrical inner surface 8 of the inner ring 6 sits on a corresponding cylindrical seat section of the shaft 2. However, the cylindrical outer surface 7 of the outer ring 5 sits on the cylindrical seat surface 11 of a support section 10, which is a component of a bearing support 9.

A clearance fit is present between the cylindrical outer surface 7 of the outer ring 5 and the cylindrical seat surface 11 of the support section 10, i.e., using a sliding seat the outer ring 5 can be displaced in the axial direction a on the support section 10.

Furthermore the bearing support 9 includes another attachment flange 15, as well as (in its right axial end region) a shoulder 17. This shoulder 17 is configured fitted to a formation 18 in the housing 3 such that the shoulder 17 forms a centering means 12, using which the bearing support 9 can be centered on the housing 3.

If the bearing support 9 including its shoulder 17 is inserted into the formation 18 in the housing 3, the attachment flange 15 abuts with its end side on the housing 3, and is fixed to the housing 3 only using indicated attachment means 13 in the form of screws.

In its (right) axial end section the bearing support 9 has a radially inwardly extending inner section 19, which includes one of the end sides facing the rolling-element bearing 4. Between this and the end side of the outer ring 5 a spring element 14 is placed—here in the form of a coil spring— which exerts an axial preload force on the outer ring 5. Since the bearing 4 is configured as a deep groove ball bearing and can thus transmit both radial and axial forces, the bearing 4 including the inner ring 6 is pressed against a collar 20 on the shaft 2.

So that a unit, which is comprised of the bearing 4, the bearing support 9, and the spring element 14 is formed in the still-unassembled state, a stop 16 in the form of a snap ring is inserted in the (left) axial end region of the support section 10. Thus a captive, preinstalled unit exists in the not-yet-assembled state of the bearing assembly. The installation of this unit is designed to be very simple due to the centering means 12.

In the exemplary embodiment according to FIG. 1 the bearing support 9 is thus configured as a solid flange housing, wherein it is preferably comprised of steel.

Figure 2:
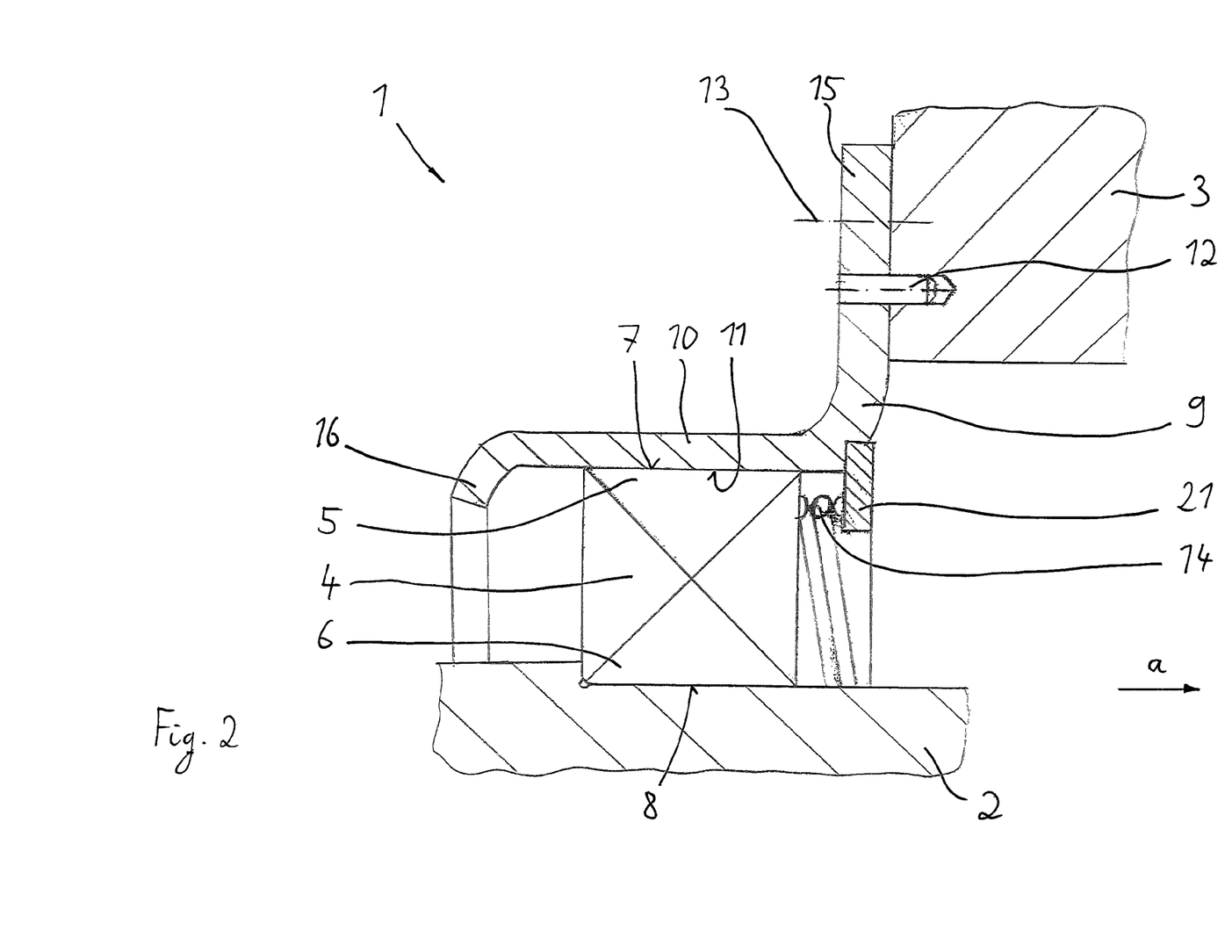
FIG. 2 shows the bearing assembly in the depiction as in FIG. 1 according to a second embodiment of the invention.

An alternative design is visible in FIG. 2, wherein a formed (steel) metal-plate part is used as bearing support 9. The stop 16 is formed here by an inwardly bent section of the support section 10. The abutment surface for the spring element 14 is formed by a support ring 21, which is welded or soldered on the bearing support 9.

Here it is also in contrast to the solution in FIG. 1 that the centering means 12 are formed as alignment pins.

Otherwise the solution depicted in FIG. 2 substantially corresponds to that according to FIG. 1.

Figure 3:
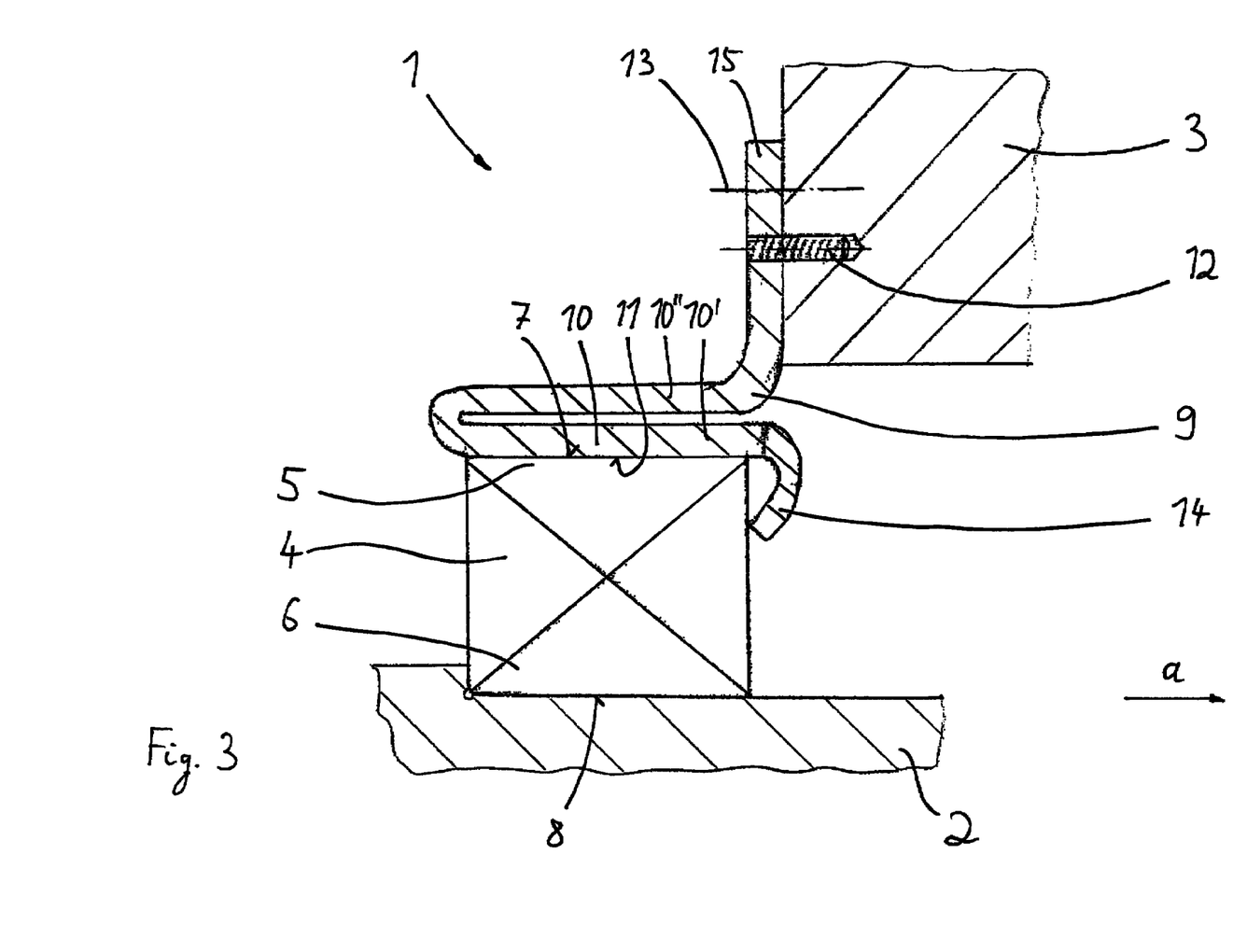
FIG. 3 shows the bearing assembly in the depiction as in FIG. 1 according to a third embodiment of the invention.

A further variant is depicted in FIG. 3. A metal-plate part is also used here as bearing support 9, which metal-plate part here, however, includes two parts 10' and 10" folded over against each other (everted bowl), which together form the support section 10.

Furthermore, here the spring element 14 is designed differently than described above. Namely, it is formed by a bent end section of the one part 10' of the support section 10 (similar to a disc spring). For increasing the elasticity of this spring section it can be provided with slits that in particular extend radially.

Also here no stop 16 is provided as in the solutions according to FIG. 1 and FIG. 2. In this case the bearing 4 can thus later also still be pushed on (from the left) the support section 10. Thus, provided the assembly process requires it, the bearing can also be supplied separately. A stop 16 would also optionally be possible.

Figure 4:
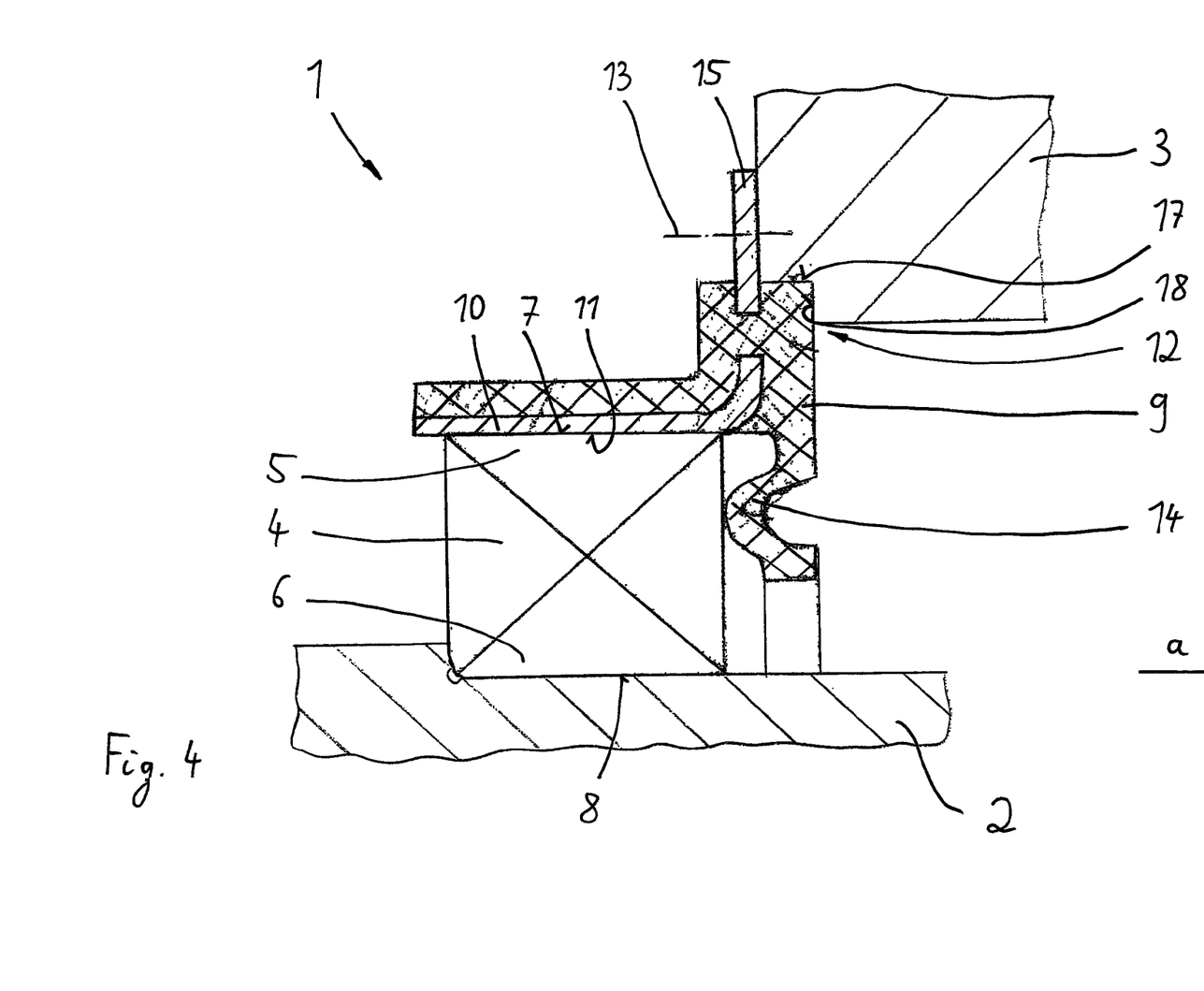
FIG. 4 shows the bearing assembly in the depiction as in FIG. 1 according to a fourth embodiment of the invention.

In FIG. 4 a solution is visible wherein the bearing support 9 is comprised of a bent metal plate that forms the support section 10 and the attachment flange 15. This metal plate has been surrounded by a plastic mass, for example, by injection molding, in order to obtain the form that is visible in radial section in FIG. 4. Here the plastic material also forms the shoulder 17, which forms the centering means 12.

It is worth mentioning here that the spring element 14 is formed by plastic material. In this example the sketched contour is manufactured in the same manufacturing process as with the bearing support 9, and thus from the same plastic material, and can once again—for the purpose of increasing the elasticity of the spring element 14—be provided with (radial) slits.

Alternatively for the forming of the spring element a multiple-component forming process can once again be considered, which has the advantage that a unit having different material properties can be realized.

Similar to the solution according to FIG. 3, here once again no stop 16 is provided, which, however, would optionally be possible. What has been said with respect to FIG. 3 applies in this regard.

Figure 5:
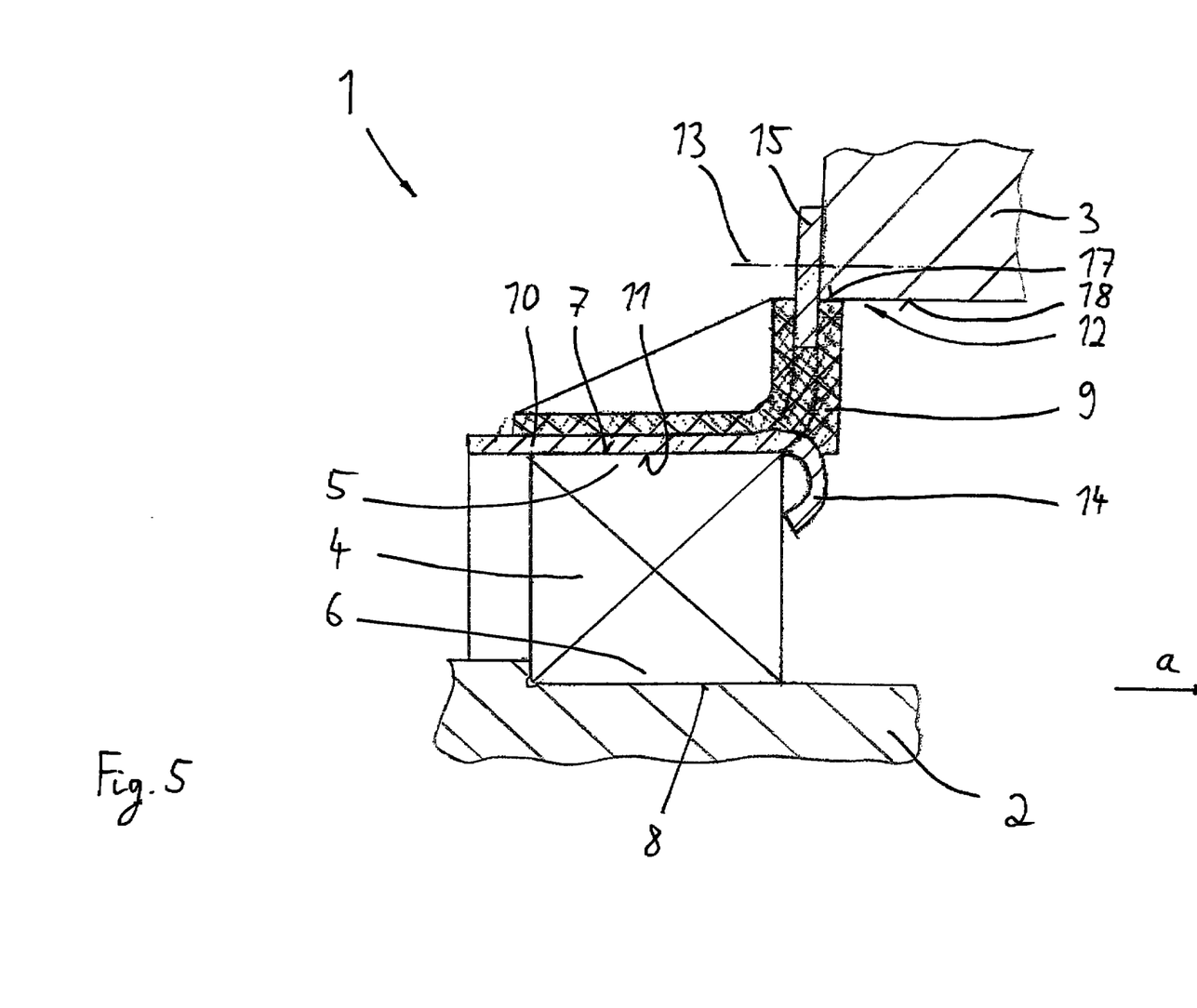
FIG. 5 shows the bearing assembly in the depiction as in FIG. 1 according to a fifth embodiment of the invention.

According to FIG. 5 a solution similar to FIG. 4 is visible. Here, however, a metal-plate part, which forms the support section 10, also forms the spring element 14. This disc-spring-type region can again be slitted in order to increase the elasticity. The attachment flange 15 can be configured as a disc, wherein this and the support section 10 are connected to each other by plastic material, which forms the further bearing support 9. This plastic material once again here forms the shoulder 17 in order to realize the centering means 12.

With respect to the stop 16 also missing here reference is made to the embodiments of FIG. 3 and FIG. 4; however, such a stop is optionally possible.

Figure 6:
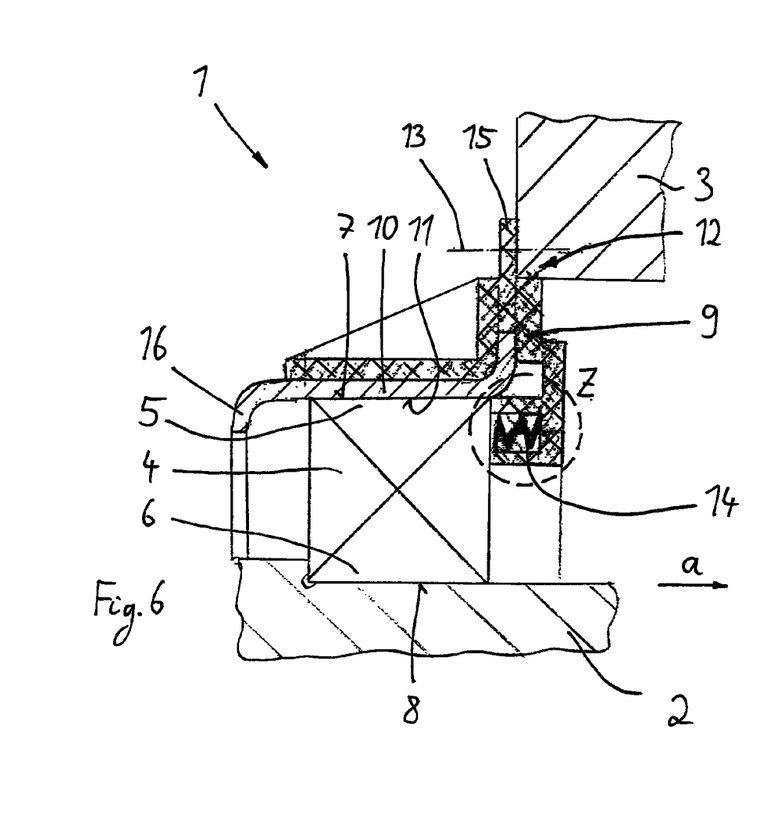
FIG. 6 shows the bearing assembly in the depiction as in FIG. 1 according to a sixth embodiment of the invention.
Figure 7:
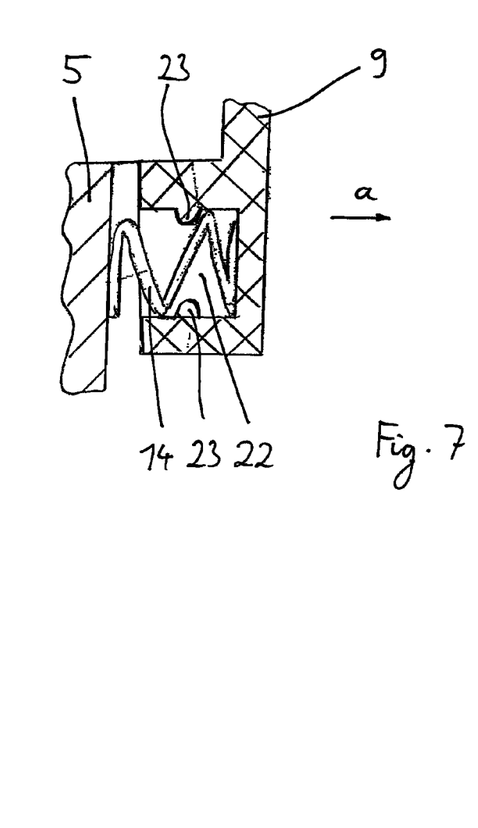
FIG. 7 shows the detail "Z" according to FIG. 6.

FIG. 6 and FIG. 7 show a further variant. The plastic material that surrounds the metal-plate section 10 and 15 is formed here such that a plurality of receiving chambers 22 disposed distributed around the circumference are formed, in which a spring element 14 can be placed. So that the spring element 14 is held in the receiving chamber 22, burls 23 or similarly formed elements can be formed, which form an undercut and hold the spring element 14. In the present case spring elements 14 in the form of separate components are thus used (of which in FIG. 6 only one is sketched).

The centering means 12 is formed in turn by a shoulder in the plastic material.

In this exemplary embodiment a stop 16 is once again provided, which prevents the bearing 4 from sliding out axially. The stop 16 is formed by a bent-inward end section of the support section 10. In this way a captive, preinstalled unit can in turn be provided.

Figure 8:
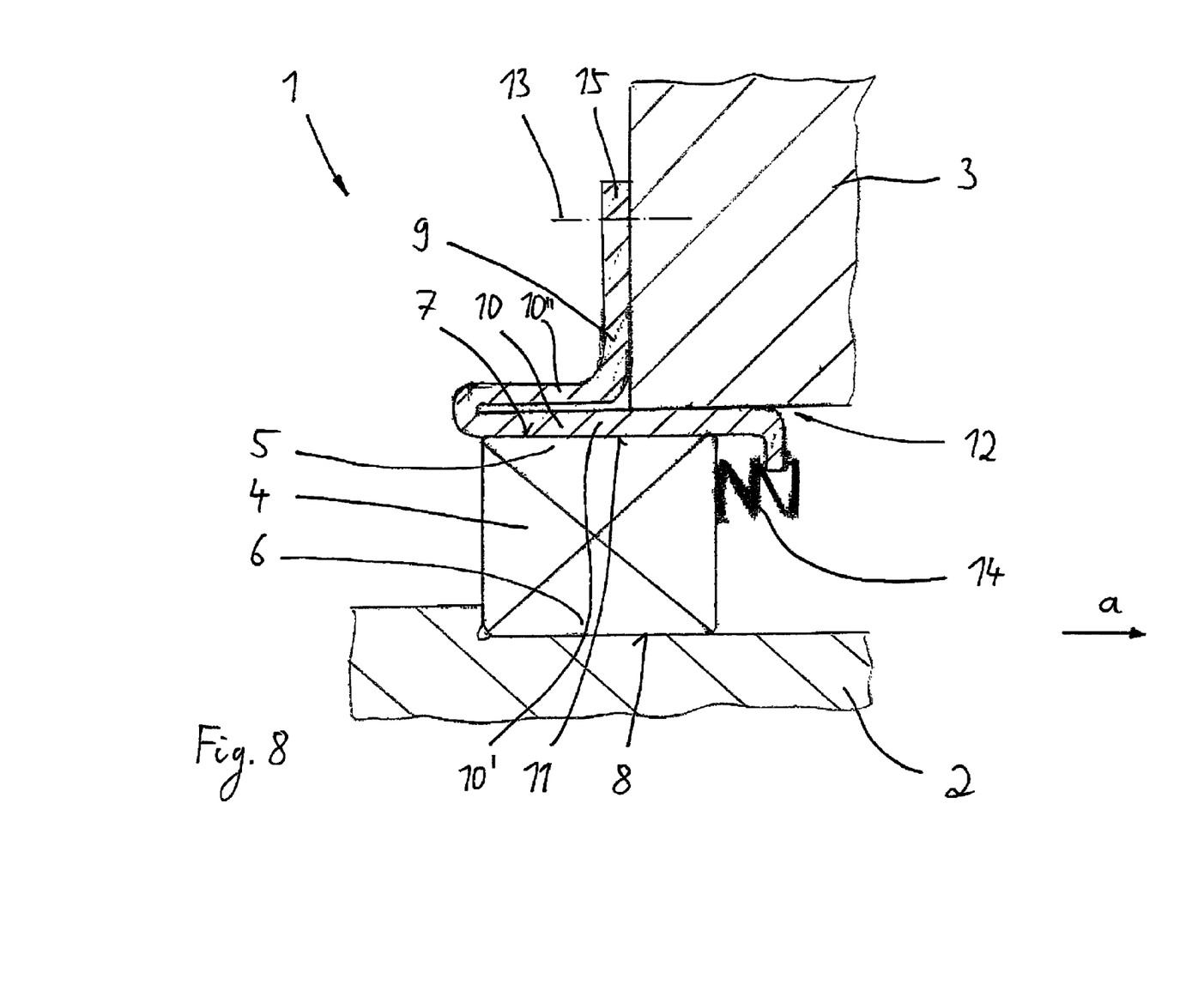
FIG. 8 shows the bearing assembly in the depiction as in FIG. 1 according to a seventh embodiment of the invention.

FIG. 8 shows a final variant. Here a pure metal-plate part is again used as bearing support 9. A plate section formed in the manner of an everted bowl, including the parts 10' and 10", forms the support section 10, which the bearing 4 receives (here: again without stop 16). The part 10" then merges into the attachment flange 15. The extension of the part 10' provides the centering means 12, i.e. the (rightward) protruding region of the part 10' can be inserted into the bore in the housing 3 in order to center the bearing support 9.

At the (right) end of the part 10' there is a radially inwardly bent section, which represents the retaining for spring element 14 (of which only one is sketched in FIG. 8).

In this figure the solution is once again sketched without stop 16 for the outer ring of the bearing 4, which, however, would optionally be possible. What has been said above with respect to FIG. 3, FIG. 4, and FIG. 5 applies in this regard.

REFERENCE NUMBER LIST

1 Bearing assembly
2 First component (shaft)
3 Second component (housing)
4 Bearing
5 Bearing ring (outer ring)
6 Bearing ring (inner ring)
7 Cylindrical outer surface
8 Cylindrical inner surface
9 Bearing support
10 Support section
10' Part of the support section
10" Part of the support section
11 Cylindrical seat surface
12 Centering means
13 Attachment means (screw)
14 Spring element (spring- and/or damping-element)
15 Attachment flange
16 Stop
17 Shoulder
18 Formation
19 Inner section
20 Collar
21 Support ring
22 Receiving chamber
23 Burls
a Axial direction
r Radial direction

The invention claimed is:

1. A bearing assembly having a non-locating-bearing function, and configured to rotatably support a first component relative to a second component while permitting relative axial displacement of the first and second components, the bearing assembly comprising:

a bearing having an inner ring, an outer ring and rolling elements being configured for transmitting radial and axial forces, wherein at least one of the inner ring and the outer ring includes a first radially extending surface forming a first axial end of the at least one of the inner ring and outer ring, a second radially extending surface forming a second axial end of the at least one of the inner ring and the outer ring, and an at least partially cylindrical surface extending entirely between and connecting the first and second radially extending surfaces, a bearing support, which includes a support section having an at least partially cylindrical seat surface configured for receiving the at least partially cylindrical surface of the at least one of the inner and outer bearing rings such that, in cross-section, the at least partially cylindrical seat extends entirely across and entirely overlaps the at least partially cylindrical surface, and forming a sliding seat for the at least one of the inner and outer bearing rings, which allows a relative displacing in the an axial direction between the support section and the at least one of the inner and outer bearing rings, wherein the bearing support includes centering means for centering the bearing support relative to one of the first and second components, wherein the bearing support is configured to be attached to one of the first and second components, wherein a spring element is disposed on or in the bearing support, the spring element being configured for generating a spring force in the axial direction between the bearing support and the at least one of the inner and outer bearing rings, the spring element being formed from a segment of the bearing support, the spring element directly contacting the second radially extending surface of the at least one of the inner ring and the outer ring and applying the spring force thereto in a direction towards the first radially extending surface, and wherein the spring force applied by the spring element axially preloads the bearing such that no component of the bearing assembly is configured to apply an axial force, that is opposite in direction to the spring force applied by the spring element, directly to the first radially extending surface of the at least one of the inner ring and the outer ring or a portion of the at least partially cylindrical surface that extends in a direction having a radial dimension.

2. The bearing assembly according to claim 1, wherein the bearing is a rolling-element bearing.

3. The bearing assembly according to claim 2, wherein the bearing comprises a deep-groove ball bearing.

4. The bearing assembly according to claim 1 wherein the bearing support includes a radially extending attachment surface, using which it can be attached on the one of the first and second components using attachment means.

5. The bearing assembly according to claim 4, wherein the attachment means are screws.

6. The bearing assembly according to claim 1 including a stop in an axial end region of the support section for limiting the axial movability of the at least one of the first and second bearing rings relative to the support section.

7. The bearing assembly according to claim 1, wherein the centering means are formed by a shoulder, which is formed in the bearing support and which engages into a congruent formation in the one of the first and second components.

8. The bearing assembly according to claim 1, wherein the bearing support and the bearing together with the spring element are configured as a preassembled unit.

9. The bearing assembly according to claim 1, wherein the bearing support is comprised of a continuously formed metal-plate part or includes a continuously formed metal-plate part.

10. The bearing assembly according to claim 1, wherein the first component comprises a shaft and the second component comprises a housing.

11. The bearing assembly according to claim 1,
wherein the bearing comprise a rolling-element bearing,
wherein the bearing support includes a radially extending attachment surface,
the bearing assembly including a stop in an axial end region of the support section, the stop configured for limiting axial movement of the at least one of the inner and outer bearing rings relative to the support section,
wherein the centering means comprise a shoulder on the bearing support, and
wherein the bearing support is comprised of a continuously formed metal-plate part or includes a continuously formed metal-plate part.

12. A bearing assembly having a non-locating-bearing function, and configured to rotatably support a shaft relative to a housing while permitting relative axial displacement of the shaft relative to the housing, the bearing assembly comprising:
a bearing having an inner ring, an outer ring and rolling elements being configured for transmitting radial and axial forces, one of the inner ring and the outer ring having a first radially extending surface forming a first axial end of the one of the inner ring and the outer ring, a second radially extending surface forming a second axial end of the one of the inner ring and the outer ring, and an at least partially cylindrical surface extending entirely between and connecting the first and second radially extending surfaces;
a bearing support attachable to the housing and including a support section having an at least partially cylindrical seat surface configured for receiving the at least partially cylindrical surface of the one of the inner and outer bearing rings such that, in cross-section, the at least partially cylindrical seat extends entirely across and entirely overlaps the at least partially cylindrical surface, and forming a sliding seat for the one of the inner and outer bearing rings, the sliding seat allowing a relative axial displacement between the support section and the one of the inner and outer bearing rings,
centering means for centering the bearing support relative to one of the housing; and
a spring element disposed on or in the bearing support, the spring element being configured for generating a spring force in an axial direction between the bearing support and the one of the inner and outer bearing rings, the spring element being formed from a segment of the bearing support, the spring element directly contacting the second radially extending surface of the at least one of the inner ring and the outer ring and applying the spring force thereto in a direction towards the first radially extending surface, and wherein the spring force applied by the spring element axially preloads the bearing such that no component of the bearing assembly is configured to apply an axial force, that is opposite in direction to the spring force applied by the spring element, directly to the first radially extending surface of the at least one of the inner ring and the outer ring or a portion of the at least partially cylindrical surface that extends in a direction having a radial dimension.

13. The bearing assembly according to claim 12, wherein the spring element extends from a location radially outward of an outer surface of the outer ring to a location radially inward of the outer surface of the outer ring.

14. The bearing assembly according to claim 12, wherein the spring comprising a circular trough at an axial end of the support section.

15. The bearing assembly according to claim 12, wherein a circular trough includes radial slits.

16. The bearing assembly according to claim 12, wherein the spring element comprising a bent end portion of the support section.

* * * * *